No. 881,394. PATENTED MAR. 10, 1908.
C. FOSS.
HAY FORK.
APPLICATION FILED DEC. 10, 1907.

2 SHEETS—SHEET 2.

Witnesses
Arthur Wesley
M. A. Schmidt

Inventor
Charles Foss.
By M. B. Flocusles
Attorneys.

UNITED STATES PATENT OFFICE.

CHARLES FOSS, OF BRIGHTON, IOWA.

HAY-FORK.

No. 881,394.  Specification of Letters Patent.  Patented March 10, 1908.

Application filed December 10, 1907. Serial No. 405,883.

*To all whom it may concern:*

Be it known that I, CHARLES FOSS, a citizen of the United States, residing at Brighton, in the county of Washington and State of Iowa, have invented certain new and useful Improvements in Hay-Forks, of which the following is a specification.

This invention relates to hay-forks, and more particularly that kind known as harpoon-forks.

The object of the invention is to provide an improved fork which sets itself while going into the hay, and also one which can be easily tripped to release the load.

The invention is illustrated in the accompanying drawings in which

Figure 1:
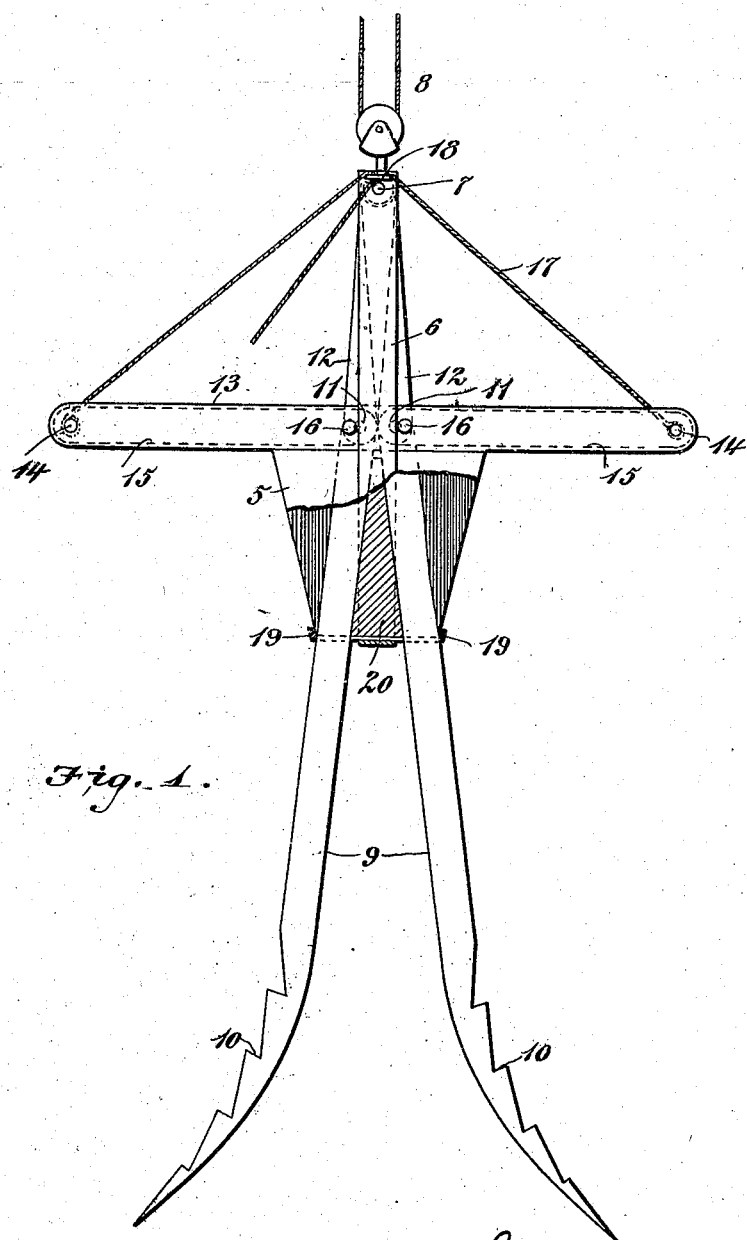
Figures 2, 3:
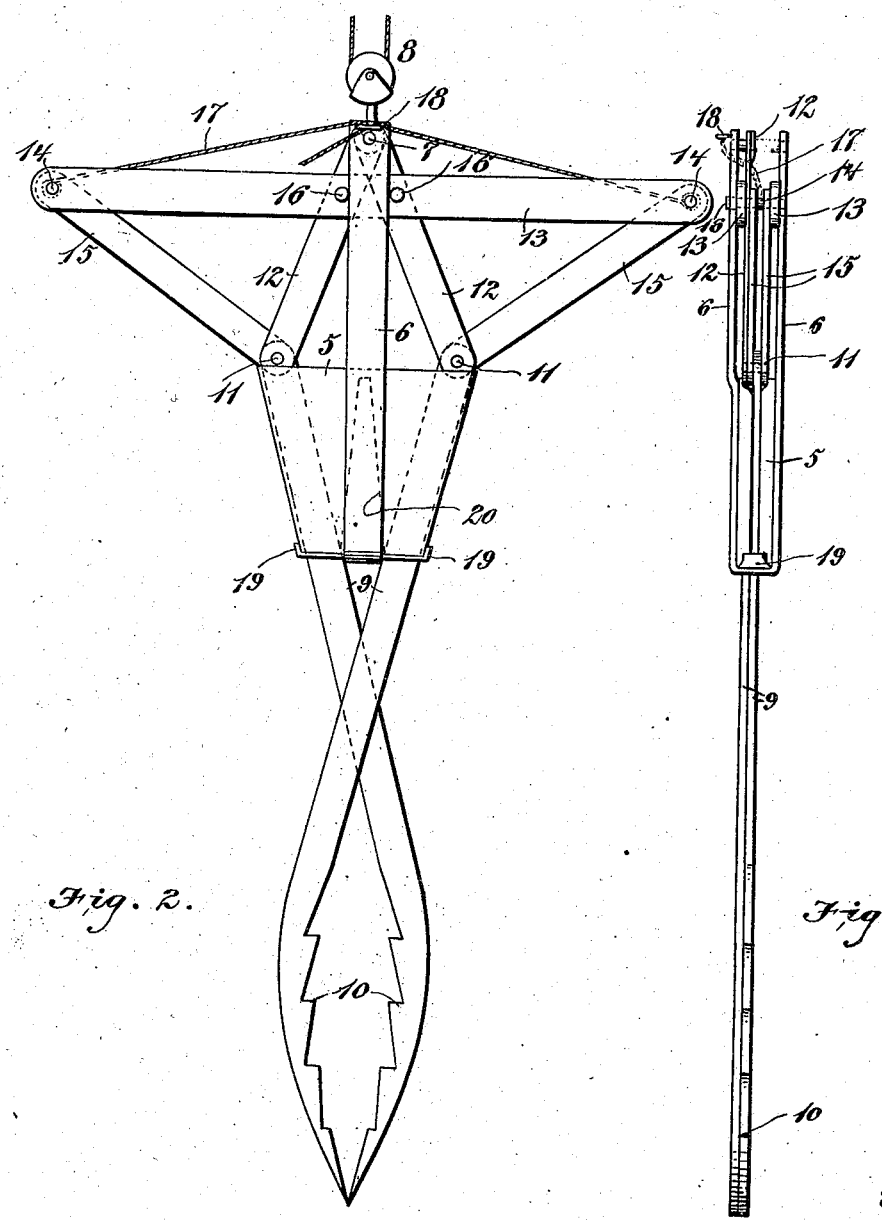

Figure 1 is an elevation partly in section showing the fork open. Fig. 2 is an elevation showing the fork closed. Fig. 3 is an edge view thereof.

Referring specifically to the drawings, the supporting-frame of the fork comprises two spaced plates 5 which are mounted in a yoke the two branches 6 of which extend upwardly from the plates and are connected at their extremity by a cross-pin 7 to which the hoisting tackle 8 is attached.

The tines of the fork are indicated at 9. They have sharp outer ends so that they can be easily stuck into the hay, and one of their edges is barbed as indicated at 10 to increase the hold on the hay.

The inner ends of the tines work between the plates 5 and are pivotally connected as indicated at 11 to one end of links 12 which are pivoted at their other end to the cross-pin 7 whereby a toggle-joint is formed.

Between the branches 6 are mounted spaced parallel bars 13 to the extremities of which are pivoted as indicated at 14 thrust links 15 which are connected to the pivots 11. The bars 13 are horizontally presented and are slidable up and down between the branches 6. On one of the bars are projecting pins 16 which engage opposite edges of one of the branches 6 to guide the movement of the bars. To the outer ends of the bars 13 is attached a trip-rope 17 which passes through a guide ring 18 on one of the branches 6.

At the lower end of the plates 5 are cross-bars 19, and between said plates is secured a wedge-shaped block 20. The inner ends of the tines work between these cross-bars and the block on opposite sides of the latter.

When the fork is closed the sharp ends of the tines 9 come together to form a single sharp point as shown in Fig. 2 so that the fork can be easily stuck into the hay. The trip-rope 17 will be released so that the tines as they enter the hay are gradually forced apart by the pressure of the hay thereon, and they continue to spread until their inner ends engage the inclined sides of the block 20. If necessary, the bars 13 can be pressed down by hand, which, through the thrust links 15, spreads the tines. The tines spread until the bars are stopped by the upper edge of the plates 5, and when the tines are spread apart to their full extent, the thrust links 15 lie between the bars 13, and the pivots 11 and 14 lie in a straight line as shown in Fig. 1. With the parts thus at a dead center the tines cannot move in a direction to close and will be securely locked in the load which will then be hoisted and carried to the desired place. The movement of the tines herein described is guided by the cross-bars 19 and the block 20. The opposite sides of the latter are so inclined that the inner edges of the tines fit thereon when the fork is open.

To release the load, the bars 13 are pulled upwardly by the trip-rope to bring the pivots 11 and 14 off the dead center, after which the weight of the load closes the tines and the load is automatically discharged, the tines then assuming the position shown in Fig. 2.

A fork constructed as herein described has no complicated parts to get out of order, it is efficient in operation, and can be easily handled.

I claim:—

1. A hay-fork comprising a supporting-frame, links pivoted thereto, tines mounted in the frame and connected at their inner ends to the links, thrust-links connected to the aforesaid links and tines, and means for operating the thrust-links.

2. A hay-fork comprising a supporting-frame, links pivoted thereto, tines mounted in the frame and connected at their inner ends to the links, a slide-bar mounted on the frame, thrust links connected to the slide-bar and the inner ends of the tines, respectively, and a trip rope connection to the slide-bar.

3. A hay-fork comprising a supporting-frame, links pivoted thereto, tines mounted in the frame and connected at their inner ends to the links, a block in the frame between the inner ends of the tines, cross-bars in the frame extending outside the tines, a slide-bar mounted in the frame, links connecting said bar and the inner ends of the tines, and a trip rope connected to the bar.

In testimony whereof I affix my signature, in presence of two witnesses.

CHARLES FOSS.

Witnesses:
M. J. JOHNSON,
WILLIAM LAMANSKY.